United States Patent
Tabatowski-Bush et al.

(10) Patent No.: US 11,787,306 B2
(45) Date of Patent: Oct. 17, 2023

(54) ELECTRIFIED VEHICLE CONTROL TO REDUCE BATTERY SENSOR HEAT GENERATION

(71) Applicant: Ford Global Technologies, LLC, Dearborn, MI (US)

(72) Inventors: Benjamin A. Tabatowski-Bush, Ann Arbor, MI (US); John Paul Gibeau, Canton, MI (US); Baojin Wang, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 376 days.

(21) Appl. No.: 17/142,990

(22) Filed: Jan. 6, 2021

(65) Prior Publication Data

US 2022/0212561 A1 Jul. 7, 2022

(51) Int. Cl.
*B60L 58/12* (2019.01)
*B60L 50/60* (2019.01)
*H02J 7/00* (2006.01)
*B60L 58/18* (2019.01)

(52) U.S. Cl.
CPC .............. *B60L 58/12* (2019.02); *B60L 50/66* (2019.02); *B60L 58/18* (2019.02); *H02J 7/0048* (2020.01); *B60L 2240/547* (2013.01)

(58) Field of Classification Search
CPC .......... B60L 58/12; B60L 50/66; B60L 58/18; B60L 2240/547; B60L 3/12; B60L 2240/545; B60L 2240/549; B60L 58/21; B60L 58/10; H02J 7/0048; H02J 7/0047; H02J 7/007182

USPC ......................................................... 320/130
See application file for complete search history.

(56) References Cited

U.S. PATENT DOCUMENTS

| | | | |
|---|---|---|---|
| 8,089,248 B2 | 1/2012 | Tabatowski-Bush | |
| 8,170,818 B2 | 5/2012 | Lin et al. | |
| 8,531,160 B2 | 9/2013 | Moorhead et al. | |
| 8,796,986 B2 | 8/2014 | Lim et al. | |
| 2010/0261048 A1* | 10/2010 | Kim | B60L 58/12 429/150 |
| 2011/0080138 A1* | 4/2011 | Nakanishi | H02J 7/0016 320/116 |
| 2017/0259688 A1* | 9/2017 | Lee | B60L 58/12 |
| 2021/0223327 A1* | 7/2021 | Berger | G01R 31/396 |

* cited by examiner

*Primary Examiner* — Paul Dinh
(74) *Attorney, Agent, or Firm* — BROOKS KUSHMAN PC; David Kelley

(57) ABSTRACT

An electrified vehicle, system, and control method include a traction battery having a first plurality of cells and a second plurality of cell monitoring circuits each having an associated at least one of the first plurality of cells, and a controller configured to control the cell monitoring circuits to measure voltage of the associated cells at an initial frequency until a state of charge (SOC) of the traction battery is established, and to measure voltage of the associated cells at a second frequency based on the SOC after the SOC is established to reduce heat generation of the cell monitoring circuits. The cell monitoring circuits may be controlled to asynchronously measure associated cell voltage and/or to reduce voltage/current conversion time when delta cell voltage and battery pack current are below respective thresholds.

20 Claims, 5 Drawing Sheets

ELECTRIFIED VEHICLE CONTROL TO REDUCE BATTERY SENSOR HEAT GENERATION

TECHNICAL FIELD

This disclosure relates to an electric vehicle and control strategy to reduce heat generation by a battery sensor used for monitoring of a high voltage battery pack.

BACKGROUND

Electrified vehicles battery electric vehicles (BEVs) and hybrid electric vehicles (HEVs) rely on a high voltage traction battery to provide power for propulsion. Various properties and/or parameters of the battery may be monitored to control battery operation. Battery properties and/or parameters may be measured or otherwise determined directly or indirectly. Battery voltages and currents may be measured directly using sensors. A BMIC (Battery Monitoring Integrated Circuit) is an integrated circuit chip that may perform many functions related to battery monitoring and control such as measuring cell voltages, measuring module voltage, balancing cells, communication with other BMICs and/or battery controllers, etc. A BMIC may by powered by multiple cells of the traction battery. For example, if a BMIC is designed to monitor twelve cells, the voltage supplied to the BMIC can be up twelve times the individual cell voltage and is then converted or regulated to a lower voltage required by the BMIC, such as 5V or 3.3V. While this voltage conversion may be done externally, it is generally integrated in the BMIC to reduce costs and save space on the circuit board.

SUMMARY

In at least one embodiment, a vehicle comprises a traction battery having a first plurality of cells and a second plurality of cell monitoring circuits each having an associated at least one of the first plurality of cells, and a controller configured to control the cell monitoring circuits to measure voltage of the associated cells at an initial frequency until a state of charge (SOC) of the traction battery is established, and to measure voltage of the associated cells at a second frequency based on the SOC after the SOC is established. The controller may be configured to control the monitoring circuits to measure voltage of the associated cells at the second frequency when the SOC is either above a first threshold and below a second threshold, or above a third threshold and below a fourth threshold. The controller may be configured to control the monitoring circuits to measure voltage of the associated cells at the initial frequency when the SOC is either below the first threshold or above the fourth threshold. The controller may be configured to control the monitoring circuits to measure voltage of the associated cells at a third frequency when the SOC is between the third and fourth thresholds. In one embodiment, the first threshold is 20% SOC, the second threshold is 40% SOC, the third threshold is 60% SOC, and the fourth threshold is 80% SOC. The initial frequency may be greater than the second frequency and the second frequency may be greater than the third frequency. In various embodiments, the controller is configured to sequentially control each of the second plurality of cell monitoring circuits to measure voltage of the associated cells. The controller may be configured to control the cell monitoring circuits to asynchronously measure voltage of the associated cells in response to a delta cell voltage being below an associated voltage threshold and current of the traction battery being below an associated current threshold. The controller may be further configured to control the cell monitoring circuits to simultaneously measure voltage of the associated cells after all of the monitoring circuits have asynchronously measured the voltage of the associated cells. The controller may be configured to control the cell monitoring circuits to reduce duration of voltage/current conversion in response to a delta cell voltage being below an associated voltage threshold and current of the traction battery being below an associated current level.

Various embodiments include a system comprising a high voltage battery having a first plurality of battery monitoring integrated circuits (BMICs) each associated with a second plurality of battery cells, and a controller programmed to control the BMICs to simultaneously measure voltage of the second plurality of battery cells unless at least one parameter of the high voltage battery satisfies an associated criterion, and to control the BMICs in sequence to asynchronously measure voltage of the second plurality of battery cells otherwise. The at least one parameter of the high voltage battery satisfying an associated criterion may comprise a delta voltage among all the battery cells being below a voltage threshold. The at least one parameter of the high voltage battery satisfying an associated criterion may further comprise a high voltage battery pack current being below a current threshold. The controller may be further programmed to control a duration of voltage/current conversion of the BMICs to reduce the duration in response to the delta voltage being below the voltage threshold and the battery pack current being below the current threshold. The controller may be further programmed to control the BMICs to measure voltage of the second plurality of battery cells at a first frequency when a state of charge (SOC) of the high voltage battery is below a first threshold or above a fourth threshold, at a second frequency when the SOC is above the first threshold and below a second threshold or above a third threshold and below the fourth threshold, and at a third frequency when the SOC is between the second threshold and the third threshold. The first frequency may be higher than the second frequency, which is higher than the third frequency.

Embodiments also include a method for controlling an electrified vehicle having an electric machine powered by a traction battery including a first plurality of battery monitoring circuits each configured to monitor a second plurality of associated battery cells, comprising, by a controller, controlling the first plurality of battery monitoring circuits to measure voltage of the associated battery cells at a higher frequency after vehicle key-on until a state of charge (SOC) of the traction battery is established, controlling the first plurality of battery monitoring circuits to measure voltage of the associated battery cells at a lower frequency when the SOC is below a first threshold or above a second threshold, and controlling the first plurality of battery monitoring circuits to measure voltage of the associated battery cells at a lowest frequency otherwise. The method may include controlling the first plurality of battery monitoring circuits to sequentially measure voltage of the associated battery cells when a delta voltage among all the battery cells is less than a voltage threshold and a pack current of the traction battery is less than a current threshold. In one or more embodiments, the method of further includes controlling the first plurality of battery monitoring circuits to simultaneously measure voltage of the associated battery cells after completion of sequentially measuring the voltage. The method may also include controlling the first plurality of battery monitoring circuits to reduce voltage/current conversion time in response to a delta voltage among all the battery cells is less than a voltage threshold and a pack current of the traction battery is less than a current threshold. The method may also include controlling the first plurality of battery monitoring circuits to measure voltage of the associated battery cells at the higher frequency when the SOC is below a third threshold, which is below the first threshold, or when the SOC is above a fourth threshold, which is above the second threshold.

Embodiments of the disclosure may provide one or more associated advantages. For example, one or more embodiments reduce power consumption of the BMICs to reduce heat generation and average operating temperature without requiring any hardware or chip modifications. Reducing average BMIC operating temperature may maintain measurement accuracy and prolong the lifespan of the BMIC and related circuitry. Reducing power consumption of the BMICs may also improve system efficiency.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure recognizes that various types of Battery Monitoring Integrated Circuits (BMICs) used to monitor cell voltages, balance cells, etc. may experience loss of measurement accuracy and reduced life when operated at high average temperatures. While heat generation could be reduced by moving the low-dropout (LDO) voltage regulator that converts the voltage from the monitored cells (e.g. 36V for 12 cells) to the BMIC operating voltage (e.g. 3.3V or 5V), this increases cost and requires addition PCB space. A BMIC uses power for many different functions, such as communicating with other BMICs and/or microcontroller, measuring cell voltages, measuring module voltage, balancing cells, etc. The present inventors have recognized that, particularly for BMICs with parallel delta-sigma analog-to-digital converters (ADCs), the voltage measurement function draws a significant amount of power and generates associated heat. As such, the claimed subject matter controls the voltage measurement function to reduce heat generation and average operating temperature under specified operating conditions, which does not require any hardware changes. Rather, various embodiments reduce the number of voltage measurements by implementing asynchronous measurement, reduced sampling frequency of synchronous measurement, and/or reduced voltage/conversion time when specified operating conditions are met.

Figure 1:
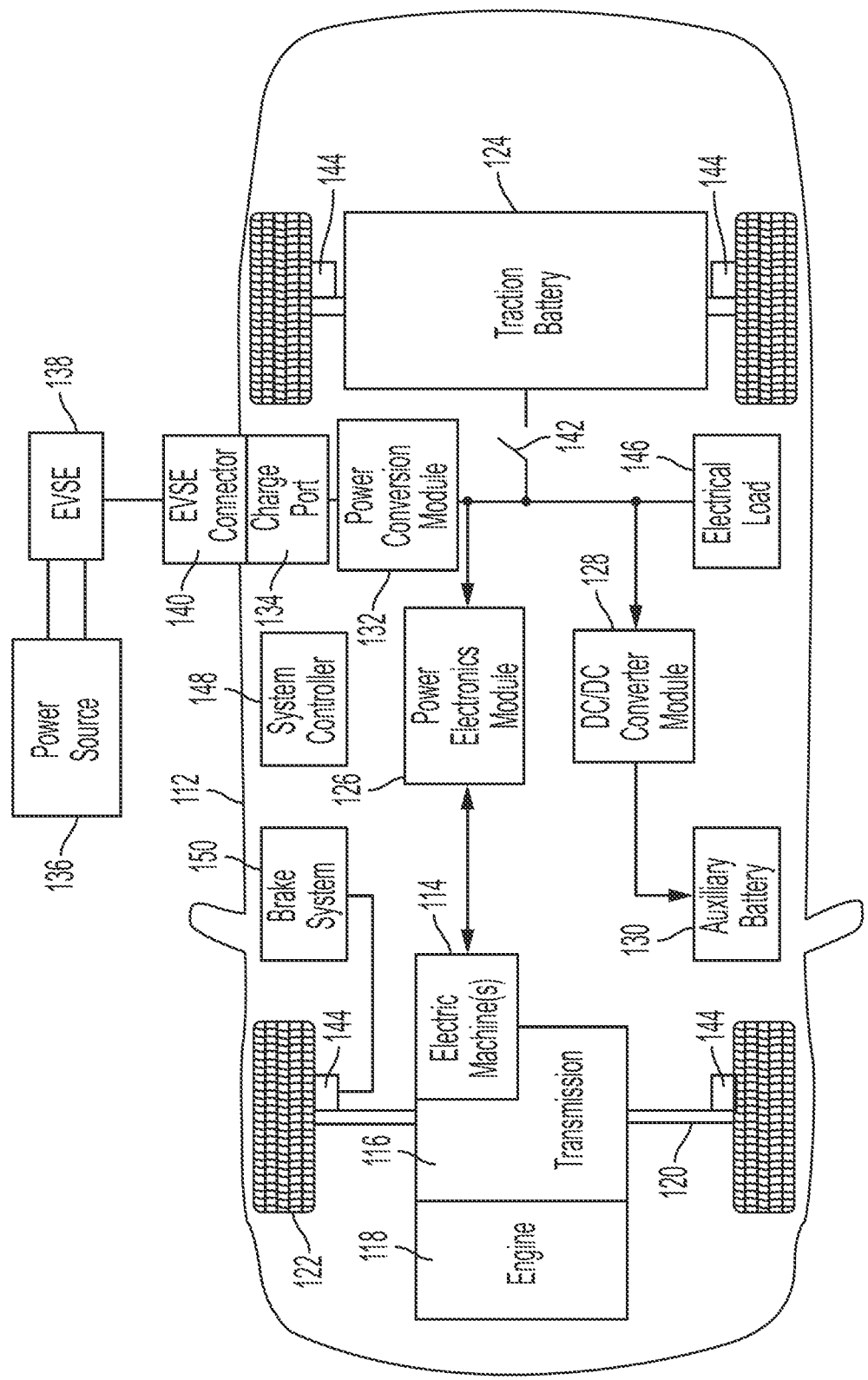
FIG. 1 is a diagram of a representative electrified vehicle with battery sensor thermal management.

FIG. 1 depicts a representative electrified vehicle, which is a plug-in hybrid electric vehicle (HEV) in this example. Vehicle 112 may comprise one or more electric machines 114 mechanically connected to a transmission 116. The electric machines 114 may be capable of operating as a motor or a generator. In addition, the transmission 116 is mechanically connected to an internal combustion engine 118. The transmission 116 is also mechanically connected to a drive shaft 20 that is mechanically connected to the wheels 122. The electric machines 114 can provide propulsion and regenerative braking capability when the engine 118 is turned on or off. During regenerative braking, the electric machines 114 act as generators and can provide fuel economy benefits by recovering energy that would normally be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 includes a plurality of low voltage battery cells connected in series and/or parallel to provide a high voltage battery pack that stores energy that can be used by the electric machines 114. A vehicle battery pack 124 typically provides a high voltage DC output and may include various associated battery sensors or BMICs controlled according to one or more embodiments as described herein for thermal management. The traction battery 124 is electrically connected to one or more power electronics modules. One or more contactors 42 may isolate the traction battery 124 from other components when opened and connect the traction battery 124 to other components when closed. A power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may require a three-phase AC current to function. The power electronics module 126 may convert the DC voltage to a three-phase AC current as required by the electric machines 114. In a regenerative mode, the power electronics module 126 may convert the three-phase AC current from the electric machines 114 acting as generators to the DC voltage required by the traction battery 124. The description herein is equally applicable to a pure electric vehicle, often referred to as a battery electric vehicle (BEV). For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A typical system may include a DC/DC converter module 128 that converts the high voltage DC output of the traction battery 124 to a low voltage DC supply that is compatible with other vehicle loads. Other high-voltage loads, such as compressors and electric heaters, may be connected directly to the high-voltage without the use of a DC/DC converter module 128. The low-voltage systems may be electrically connected to an auxiliary battery 30 (e.g., 12V, 24V, and/or 48V battery).

The electrified vehicle 112 may be an electric vehicle or a plug-in hybrid vehicle in which the traction battery 124 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 112. In other embodiments, the vehicle 112 may employ wireless charging, which may be referred to as hands-free or contactless charging that uses inductive or similar wireless power transfer.

The external power source 36 may provide DC or AC electric power to the EVSE 138. The EVSE 138 may have a charge connector 40 for plugging into a charge port 134 of the vehicle 112. The charge port 134 may be any type of port configured to transfer power from the EVSE 38 to the vehicle 112. The charge port 134 may be electrically connected to a charger or on-board power conversion module 132. The power conversion module 132 may condition the power supplied from the EVSE 38 to provide the proper voltage and current levels to the traction battery 124. The power conversion module 132 may interface with the EVSE 38 to coordinate the delivery of power to the vehicle 112. The EVSE connector 140 may have pins that mate with corresponding recesses of the charge port 134. Alternatively, various components described as being electrically connected may transfer power using a wireless inductive coupling as previously described.

One or more wheel brakes 144 may be provided for friction braking of the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that are required to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 to achieve desired operation. The brake system 150 may respond to driver commands and may also operate autonomously to implement features such as stability control. The controller of the brake system 150 may implement a method of applying a requested brake force when requested by another controller or sub-function.

One or more electrical loads 146 may be connected to the high-voltage bus. The electrical loads 146 may have an associated controller that operates the electrical load 146 when appropriate. Examples of electrical loads 146 may be a heating module or an air-conditioning module.

The various components discussed may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components.

Figure 2:
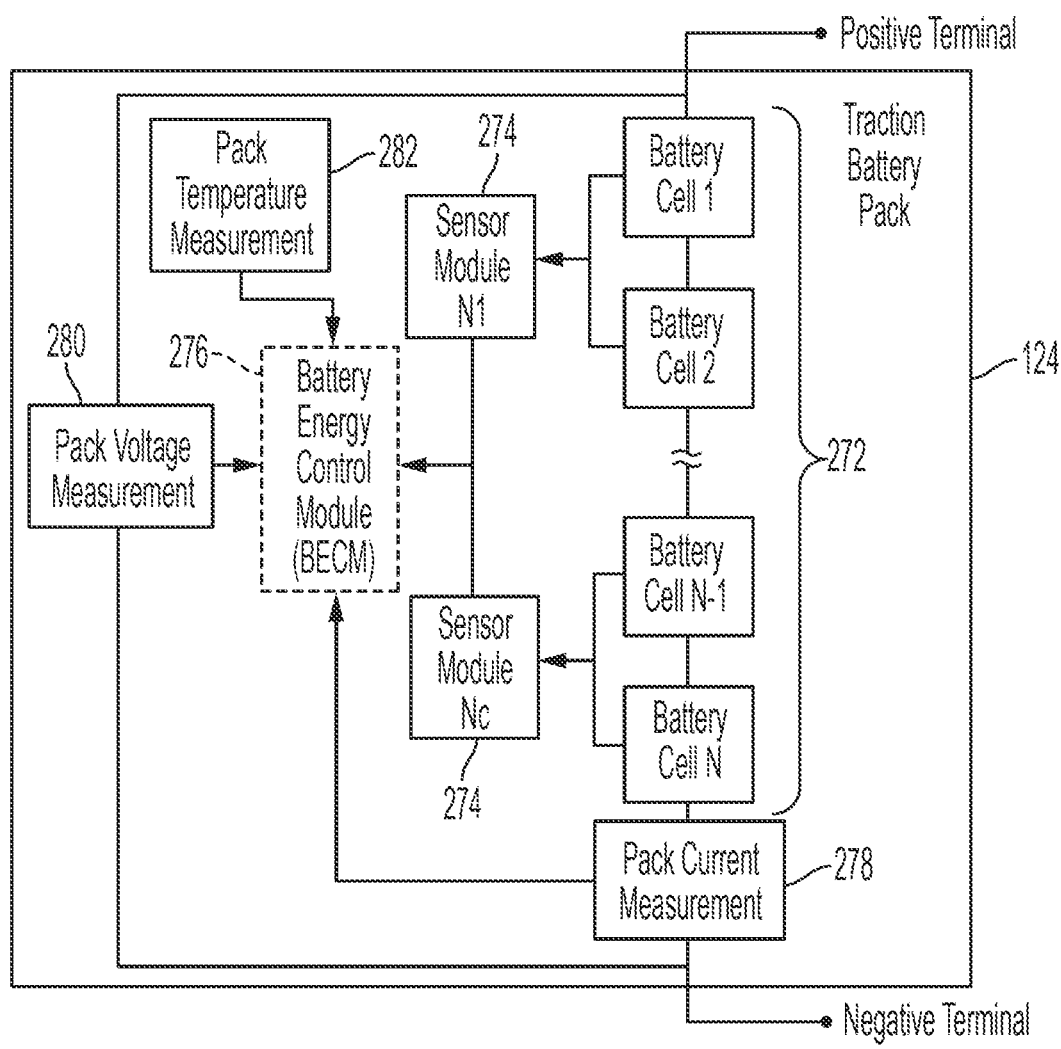
FIG. 2 illustrates a representative high voltage battery pack with multiple battery cells and associated battery sensor integrated circuits.

A traction battery 124 may employ a variety of chemical formulations. Typical battery pack chemistries may be lead-acid, nickel-metal hydride (NIMH), or lithium-ion having a series configuration of N battery cells 272 as generally represented in FIG. 2. Other battery packs may be composed of any number of individual battery cells connected in series or parallel or some combination thereof. A typical system may have one or more system controllers 276, such as a Battery Energy Control Module (BECM) that monitors and controls the performance of the traction battery 124. The BECM 276 may employ multiple BMICs 274 to monitor battery cell parameters and determine corresponding battery pack level characteristics such as pack current 278, pack voltage 280, and pack temperature 282. The BECM 276 may have non-volatile memory such that data may be retained when the BECM 276 is in an off condition. Retained data may be available upon the next key cycle.

In addition to the pack level characteristics, traction battery 124 uses multiple BMICs 274 to monitor and/or control battery cell level characteristics that are measured, monitored, and controlled. For example, the voltage, current, and temperature of each one of cells 272 or a group of cells 272 may be measured depending on the particular application and implementation. Each BMIC 274 may be connected to and monitor an individual one of battery cells 272, or may be associated with two or more cells 272. In one embodiment, each BMIC is associated with twelve (12) battery cells 272. BECM 276 may control or trigger various functions performed by BMICs 274, such as the frequency and timing of voltage measurements and the conversion time used to convert voltage/current measurements.

As previously described BMICs 274 may include a number of integrated circuits to perform various functions such as communicating with one another and with BECM 276, charge balancing cells 272, measuring voltage of individual ones or groups of cells 272, etc. BMICs 274 may include parallel delta-sigma ADCs to perform voltage measurements that draw significant power. Voltage/current conversion circuits may also draw significant power, particularly when precise measurements are required to reduce noise.

Various embodiments measure, calculate or otherwise determine various characteristics, properties, and/or parameters of the battery pack to control operation of the battery pack and/or the vehicle. Quantities such as battery power capability, battery state of charge (SOC), and battery state of health (SOH) may be used for controlling the operation of the battery pack during charging/discharging while the vehicle is operating as well as any electrical loads receiving power from the battery pack. Battery power capability provides an indication of the amount of power the battery can provide or the amount of power that the battery can receive or store. The battery power capability may be used to manage electrical loads such that the power requested is within desired limits for the particular battery or operating conditions. Battery pack state of charge (SOC) provides an indication of the amount of charge remaining in the battery pack. The battery pack SOC may be output or broadcast by the vehicle network to inform the driver of remaining charge and/or estimated travel distance, similar to a fuel gauge. The battery pack SOC may also be used to control the operation of the BMICs as described herein. Calculation of battery pack SOC can be accomplished by a variety of methods.

One possible method of calculating battery SOC is to perform an integration of the battery pack current 278 over time. This is well-known in the art as ampere-hour (or amp-hour) integration.

Figure 3:
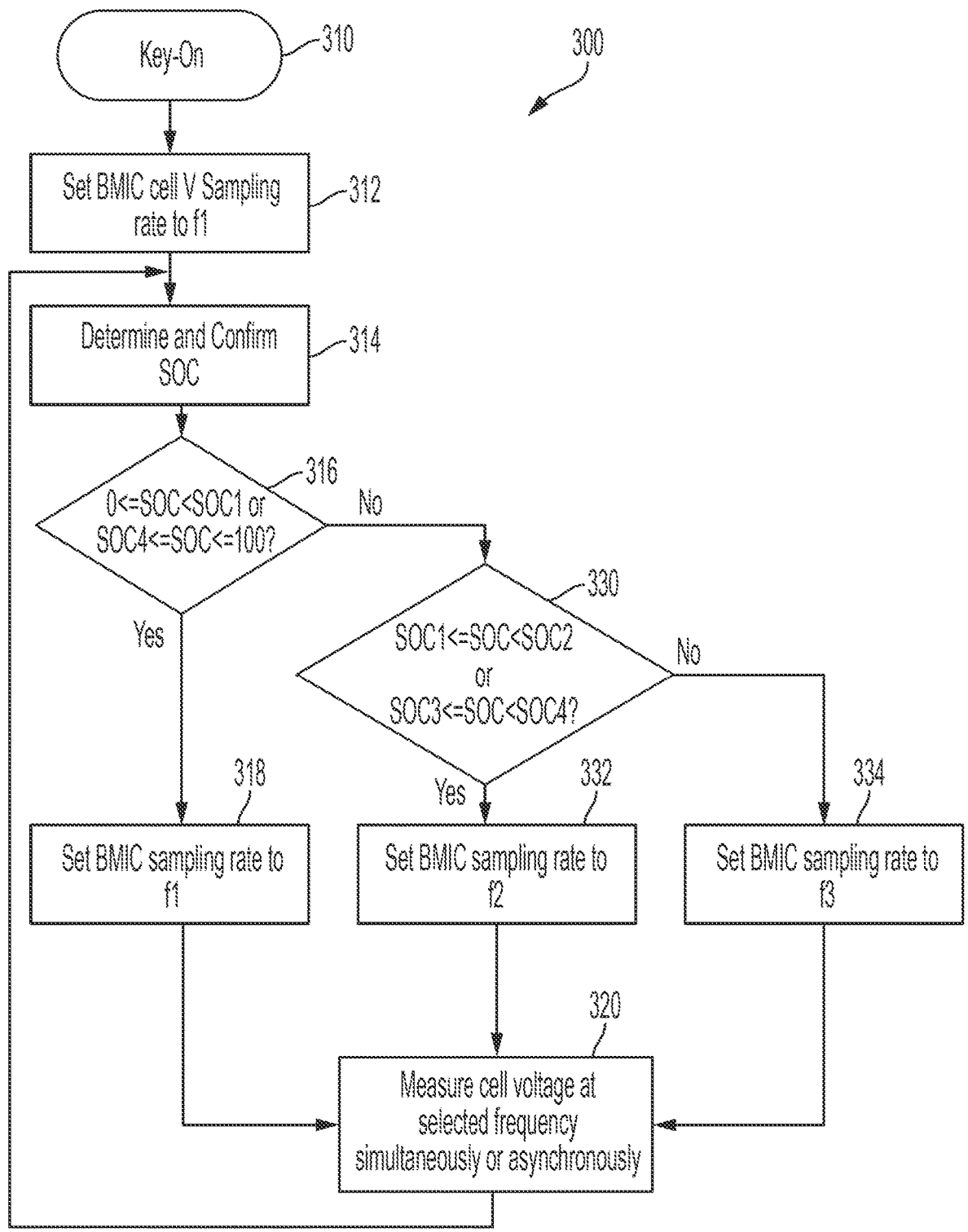
FIG. 3 is a flowchart illustrating operation of a system or method for controlling battery sensor voltage measurement frequency to reduce heat generation.
Figure 4:
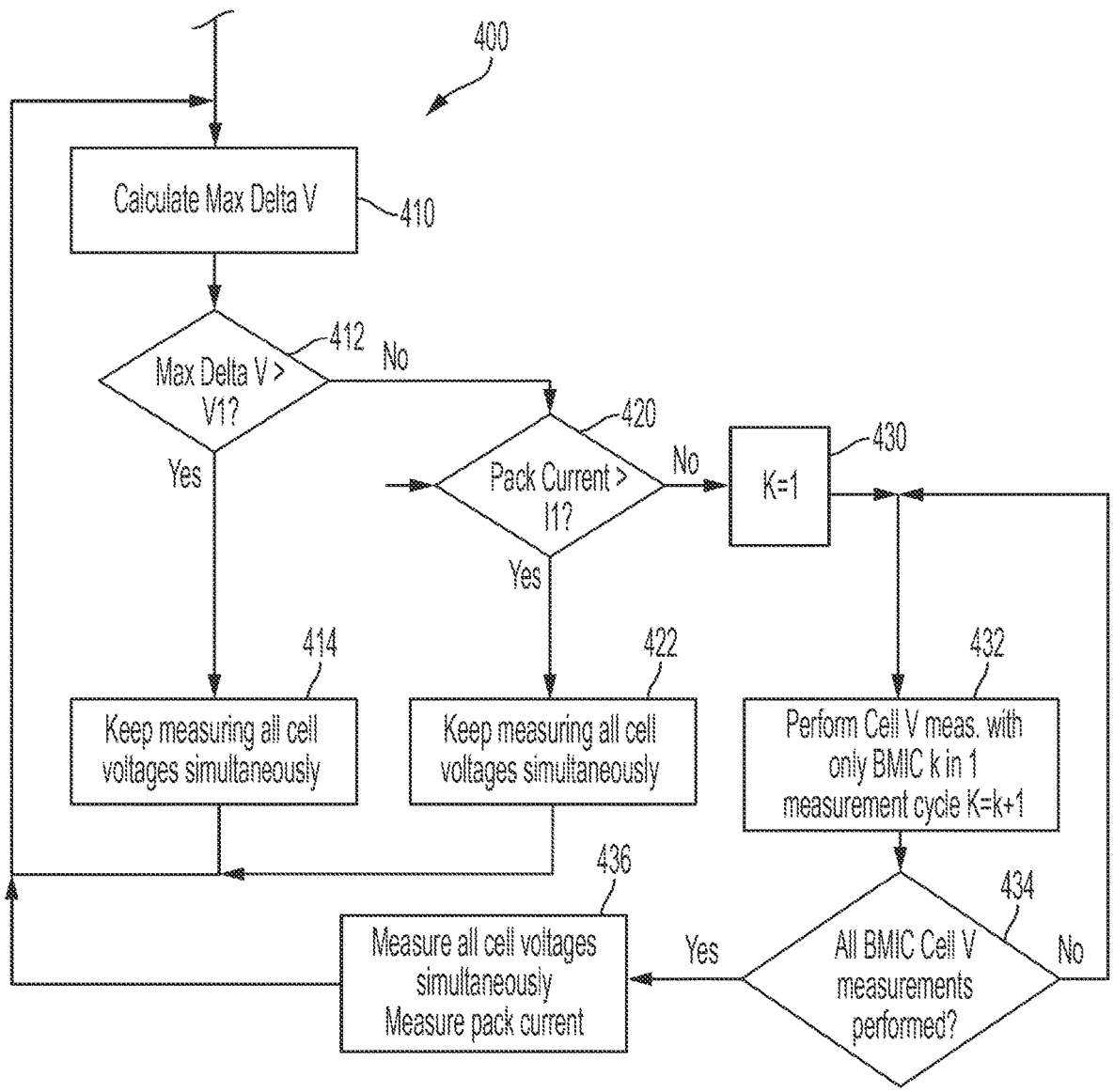
FIG. 4 is a flowchart illustrating operation of a system or method for controlling battery sensor voltage measurements asynchronously to reduce heat generation.
Figure 5:
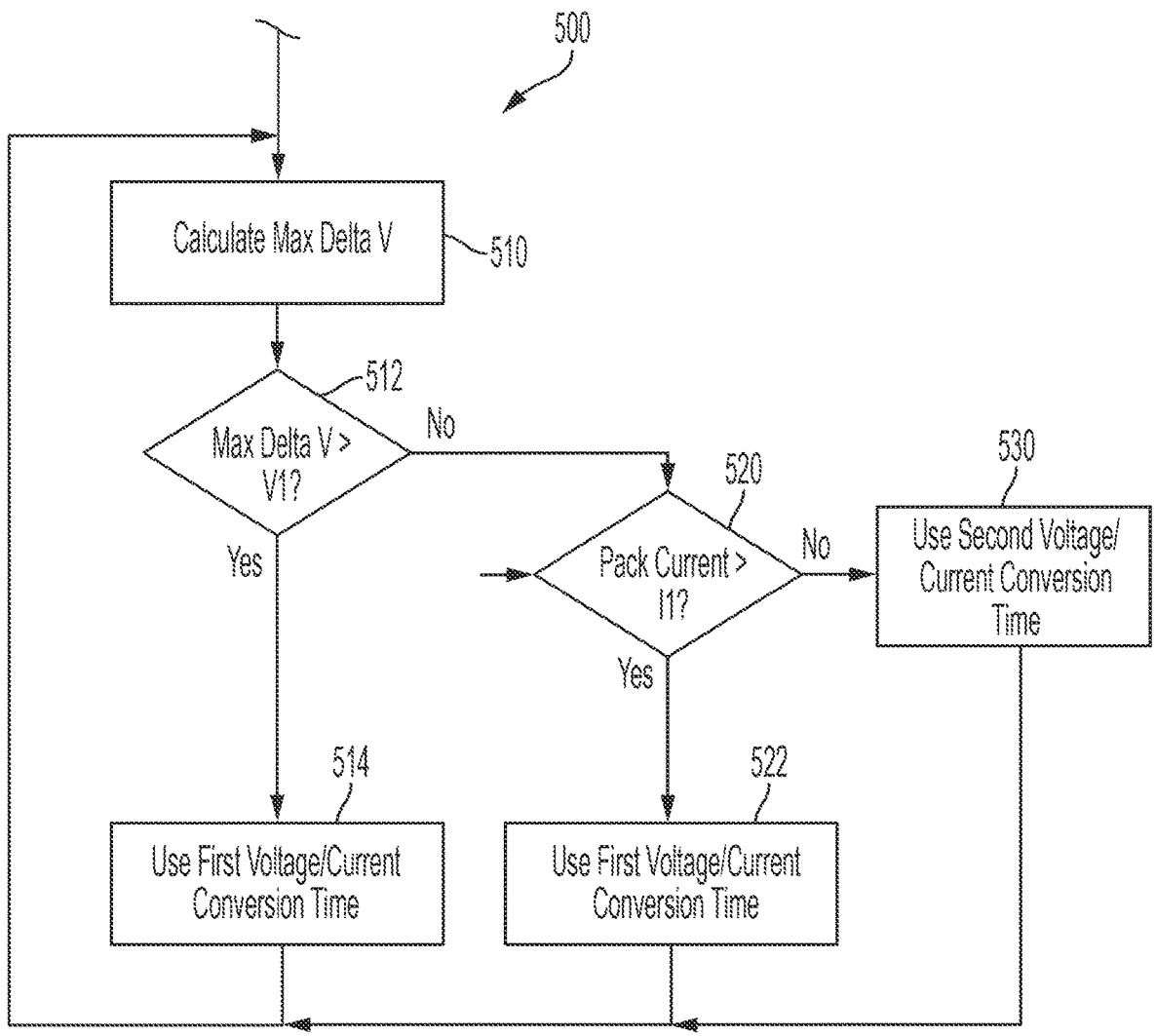
FIG. 5 is a flow chart illustrating a strategy or control logic for controlling battery monitoring circuits to reduce voltage/current conversion time to reduce heat generation.

Control logic or functions performed by BMICs 274, BECM 276, and/or system controller 148 may be represented by flow charts or similar diagrams in one or more figures, such as the flowcharts of FIG. 3-5. These figures provide representative control strategies, algorithms, and/or logic that may be implemented by a programmed microprocessor-based controller and associated circuitry and components using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or system or subsystem controller. Of course, the control logic may be implemented in software, hardware, or a combination of software and hardware in one or more controllers depending upon the particular application. When implemented in software, the control logic may be provided in one or more non-transitory computer-readable storage devices, media, or memory having stored data representing code or instructions executed by a computer to control the vehicle or its subsystems and components. The computer-readable storage devices or media may include one or more of a number of known physical devices which utilize electric, magnetic, and/or optical storage to keep executable instructions and associated calibration information, operating variables, and the like.

FIG. 3 is a flowchart illustrating operation of a system or method for controlling battery sensor voltage measurement frequency to reduce heat generation. As generally shown by control strategy or logic 300, in response to a vehicle key-on at 310, the BECM or controller controls each of the battery monitoring circuits or BMICs to measure voltage of their associate battery cells at an initial frequency or first frequency f1 at 312. In one embodiment, the first frequency is the highest frequency or sampling rate relative to other frequencies or sampling rates that are based on the battery SOC to reduce heat generation in the BMICs. The voltage measurements are performed by each BMIC for associated cells at the first frequency until the battery SOC is established as represented at 314. After the battery SOC has been determined and confirmed at 314, the voltage measuring frequency or sampling rate of the BMICs is based on the SOC as generally indicated at blocks 316 and 330.

If the battery SOC is less than a first threshold (SOC1) or greater than a fourth threshold (SOC4) as indicated at 316, then the voltage measurement frequency or BMIC sampling rate is kept at frequency f1 as indicated at 318. In one embodiment, the first threshold (SOC1) is set to 20% and the fourth threshold is set to 80%. Each BMIC then performs the cell voltage measurement for its associated battery cells at the specified frequency as represented at 320.

If The battery SOC is between the first threshold (SOC1) and a second threshold (SOC2), or between a third threshold (SOC3) and the fourth threshold (SOC4) as indicated at 330, then the voltage measurement frequency or sampling rate is set to frequency f2 as indicated at 332. Voltage measurements are then performed at the specified frequency as indicated at 320. Otherwise, the SOC is between the second threshold (SOC2) and the third threshold (SOC3) and the voltage measurement frequency or BMIC sampling rate is set to frequency f3 as indicated at 334, and the voltage measurements are performed at the selected frequency f3 as represented at 320. In various embodiments, the voltage measurement frequencies or BMIC sampling rates are such that f1 is greater than f2, which is greater than f3. In at least one embodiment, the higher or highest sampling rate f1 is used after key-on and when battery SOC is either above 80% or below 20%, whereas a lower frequency f2 is used when the battery SOC is less than 80% and greater than 20%, at least until the SOC is within a range of 50% SOC where the lowest frequency f3 is used. This is because when the SOC is around 50%, such as between 20% and 40% in this example, the voltage variation of the cell voltages is small. Additionally, even with high battery pack current, the voltage is unlikely to result in over limit conditions, so the sampling rate can be further reduced to reduce heat generation by the BMICs.

FIG. 4 is a flowchart illustrating operation of a system or method for controlling battery sensor voltage measurements asynchronously to reduce heat generation. Voltage measurement frequency or sampling rate of the BMICs may also be reduced by asynchronous or non-synchronized cell voltage measurements. Many existing strategies control all the BMICs to sample cell voltages simultaneously to identify any anomalous cells by calculating delta voltages among cells. However, if there is no significant load as indicated by relatively low battery pack current, the delta voltage is not particularly useful for diagnostic purposes. As such, various embodiments of this disclosure control the BMICs to sequentially or asynchronously perform voltage sampling or measurement to reduce heat generation as generally represented by the control strategy or logic 400 of FIG. 4.

The delta or difference in voltage measurements among the battery cells is determined to calculate the maximum delta voltage as determined at 410. If the maximum delta voltage is greater than an associated voltage threshold (V1) at 412, then the BMICs are controlled to measure all cell voltages simultaneously as indicated at 414. If the maximum delta voltage is less than (or not greater than) the threshold (V1) at 412, then the battery pack current is compared to an associated current threshold (I1) at 420. If the battery pack current is greater than the associated current threshold (I1) at 420, then the BMICs are controlled to measure all cell voltages simultaneously at 422. Otherwise, strategy 400 controls the BMICs to perform sequential or asynchronous voltage measurements as indicated at 430, 432, 434, and 436.

A counter value or index (k) is initialized at 430 to identify one of the plurality of BMICs to perform voltage measurements for associated cells, and the counter is incremented as indicated at 432. Block 434 determines whether all BMIC voltage measurements have been performed and continues asynchronous measurements by commanding each BMIC in sequence to perform the voltage measurements until completed. When synchronous measurement by all BMICs has been completed as determined at 434, a simultaneous measurement of all cell voltages is then performed along with a battery pack current measurement as indicated at 436.

FIG. 5 is a flow chart illustrating a strategy or control logic 500 for controlling battery monitoring circuits to reduce voltage/current conversion time to reduce heat generation. As previously described, the battery monitoring circuits may include an integrated voltage/current conversion circuit that also generates heat during operation. As such, various embodiments according to this disclosure reduce the conversion time to reduce heat generation under certain operating conditions where lower noise is expected, such as when the delta voltage among the cells is below an associated voltage threshold and the battery pack current is below an associated current threshold. Reducing the voltage/current conversion time will also reduce the current significantly.

The delta or difference in voltage measurements among the battery cells is determined to calculate the maximum delta voltage as determined at 510. If the maximum delta voltage is greater than an associated voltage threshold (V2) at 512, then the BMICs are controlled to provide a first voltage/current conversion time or duration as indicated at 514. If the maximum delta voltage is less than (or not greater than) the threshold (V2) at 512, then the battery pack current is compared to an associated current threshold (I2) at 520. If the battery pack current is greater than the associated current threshold (I2) at 520, then the BMICs are controlled to provide the first voltage/current conversion time or duration as indicated at 514. Otherwise, strategy 500 controls the BMICs using a second voltage/current conversion time or duration, which is less than the first voltage/current conversion time to reduce heat generation as represented at 530.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable and non-transitory storage media such as ROM devices and information alterably stored on writeable, non-transitory storage media such magnetic disks or tapes, solid-state memory or drives, CDs, RAM devices, flash memory and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While representative embodiments are described above, it is not intended that these embodiments describe all possible forms encompassed by the claims. The words used in the specification are words of description rather than limitation, and it is understood that various changes can be made without departing from the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery having a first plurality of cells and a second plurality of cell monitoring circuits each having an associated at least one of the first plurality of cells; and
a controller configured to control the cell monitoring circuits to measure voltage of the associated cells at an initial frequency until a state of charge (SOC) of the traction battery is established, and to measure voltage of the associated cells at a second frequency based on the SOC after the SOC is established.

2. The vehicle of claim 1 wherein the controller is configured to control the monitoring circuits to measure voltage of the associated cells at the second frequency when the SOC is either above a first threshold and below a second threshold, or above a third threshold and below a fourth threshold.

3. The vehicle of claim 2 wherein the controller is configured to control the monitoring circuits to measure voltage of the associated cells at the initial frequency when the SOC is either below the first threshold or above the fourth threshold.

4. The vehicle of claim 3 wherein the controller is configured to control the monitoring circuits to measure voltage of the associated cells at a third frequency when the SOC is between the third and fourth thresholds.

5. The vehicle of claim 4 wherein the initial frequency is greater than the second frequency and the second frequency is greater than the third frequency.

6. The vehicle of 1 wherein the controller is configured to sequentially control each of the second plurality of cell monitoring circuits to measure voltage of the associated cells.

7. The vehicle of claim 1 wherein the controller is configured to control the cell monitoring circuits to asynchronously measure voltage of the associated cells in response to a delta cell voltage being below an associated voltage threshold and current of the traction battery being below an associated current threshold.

8. The vehicle of claim 7 wherein the controller is configured to control the cell monitoring circuits to simultaneously measure voltage of the associated cells after all of the monitoring circuits have asynchronously measured the voltage of the associated cells.

9. The vehicle of claim 1 wherein the controller is configured to control the cell monitoring circuits to reduce duration of voltage/current conversion in response to a delta cell voltage being below an associated voltage threshold and current of the traction battery being below an associated current level.

10. A system comprising:
a high voltage battery having a first plurality of battery monitoring integrated circuits (BMICs) each associated with a second plurality of battery cells; and
a controller programmed to control the BMICs to simultaneously measure voltage of the second plurality of battery cells unless at least one parameter of the high voltage battery satisfies an associated criterion, and to control the BMICs in sequence to asynchronously measure voltage of the second plurality of battery cells otherwise.

11. The system of claim 10 wherein the at least one parameter of the high voltage battery satisfying an associated criterion comprises a delta voltage among all the battery cells being below a voltage threshold.

12. The system of claim 11 wherein the at least one parameter of the high voltage battery satisfying an associated criterion further comprises a high voltage battery pack current being below a current threshold.

13. The system of claim 12 wherein the controller is further programmed to control a duration of voltage/current conversion of the BMICs to reduce the duration in response to the delta voltage being below the voltage threshold and the battery pack current being below the current threshold.

14. The system of claim 10 wherein the controller is further programmed to control the BMICs to measure voltage of the second plurality of battery cells at a first frequency when a state of charge (SOC) of the high voltage battery is below a first threshold or above a fourth threshold, at a second frequency when the SOC is above the first threshold and below a second threshold or above a third threshold and below the fourth threshold, and at a third frequency when the SOC is between the second threshold and the third threshold.

15. The system of claim 14 wherein the first frequency is higher than the second frequency, which is higher than the third frequency.

16. A method for controlling an electrified vehicle having an electric machine powered by a traction battery including a first plurality of battery monitoring circuits each configured to monitor a second plurality of associated battery cells, comprising, by a controller:
controlling the first plurality of battery monitoring circuits to measure voltage of the associated battery cells at a higher frequency after vehicle key-on until a state of charge (SOC) of the traction battery is established;
controlling the first plurality of battery monitoring circuits to measure voltage of the associated battery cells at a lower frequency when the SOC is below a first threshold or above a second threshold; and
controlling the first plurality of battery monitoring circuits to measure voltage of the associated battery cells at a lowest frequency otherwise.

17. The method of claim 16 further comprising controlling the first plurality of battery monitoring circuits to sequentially measure voltage of the associated battery cells when a delta voltage among all the battery cells is less than a voltage threshold and a pack current of the traction battery is less than a current threshold.

18. The method of claim 17 further comprising controlling the first plurality of battery monitoring circuits to simultaneously measure voltage of the associated battery cells after completion of sequentially measuring the voltage.

19. The method of claim 16 further comprising controlling the first plurality of battery monitoring circuits to reduce voltage/current conversion time in response to a delta voltage among all the battery cells is less than a voltage threshold and a pack current of the traction battery is less than a current threshold.

20. The method of claim 16 further comprising controlling the first plurality of battery monitoring circuits to measure voltage of the associated battery cells at the higher frequency when the SOC is below a third threshold, which is below the first threshold, or when the SOC is above a fourth threshold, which is above the second threshold.

* * * * *